United States Patent
Gorski

(10) Patent No.: US 11,876,446 B2
(45) Date of Patent: Jan. 16, 2024

(54) POWER CONVERTER

(71) Applicant: THERMO KING LLC, Minneapolis, MN (US)

(72) Inventor: Matthias Gorski, Bochum (DE)

(73) Assignee: THERMO KING LLC, Minneapolis, MN (US)

( * ) Notice: Subject to any disclaimer, the term of this patent is extended or adjusted under 35 U.S.C. 154(b) by 12 days.

(21) Appl. No.: 17/826,687

(22) Filed: May 27, 2022

(65) Prior Publication Data

US 2022/0385182 A1    Dec. 1, 2022

(30) Foreign Application Priority Data

May 28, 2021 (EP) .................................... 21176494

(51) Int. Cl.
| | |
|---|---|
| *H02M 3/155* | (2006.01) |
| *H02M 7/797* | (2006.01) |
| *H02P 27/06* | (2006.01) |
| *B60R 16/023* | (2006.01) |

(52) U.S. Cl.
CPC ........... *H02M 3/155* (2013.01); *H02M 7/797* (2013.01); *H02P 27/06* (2013.01); *B60R 16/0238* (2013.01)

(58) Field of Classification Search
CPC ........ H02M 3/155; H02M 7/797; H02M 1/32; H02M 1/36; H02M 5/40; H02M 5/458; H02M 5/4585; H02M 7/125; H02P 27/06; B60R 16/0238
See application file for complete search history.

(56) References Cited

U.S. PATENT DOCUMENTS

| | | | |
|---|---|---|---|
| 7,474,066 B2 * | 1/2009 | Chanal | B60L 9/28 318/812 |
| 2007/0126377 A1 | 6/2007 | Chanal | |
| 2010/0026220 A1 * | 2/2010 | Sakai | H02P 6/08 318/400.03 |
| 2016/0329851 A1 | 11/2016 | Borisov et al. | |
| 2017/0264186 A1 | 9/2017 | Shimura et al. | |

FOREIGN PATENT DOCUMENTS

| | | | |
|---|---|---|---|
| EP | 1286459 | 2/2003 | |
| EP | 1286459 A1 * | 2/2003 | ............ B60L 15/007 |
| EP | 1 024 574 | 3/2006 | |

OTHER PUBLICATIONS

Office Action issued in corresponding European Patent Application No. 21176494.9, dated Jul. 14, 2022, 5 pages.
Extended European Search Report, issued in the corresponding EP patent application No. 21176494.9, dated Jan. 27, 2022, 8 pages.

* cited by examiner

*Primary Examiner* — Elim Ortiz
(74) *Attorney, Agent, or Firm* — Hamre, Schumann, Mueller & Larson, P.C.

(57) ABSTRACT

The present disclosure relates to a power converter for use in a host vehicle. The power converter comprises a DC link, a DC link capacitor, and a pre-charge circuit configured to charge the DC link capacitor. The pre-charge circuit comprises a boost converter comprising a switch and inductor coupling terminals configured to couple to an inductive component external to the power converter.

14 Claims, 8 Drawing Sheets

POWER CONVERTER

FIELD OF THE INVENTION

The present disclosure relates to a power converter for use in a host vehicle.

BACKGROUND

A transport climate control system is generally used to control one or more environmental conditions such as temperature, humidity, air quality, or combinations thereof, of a transport unit. Examples of transport units include, but are not limited to a truck, a container (such as a container on a flat car, an intermodal container, a marine container, a rail container, etc.), a box car, a semi-tractor, a bus, or other similar transport unit. A transport climate control system may be integrated into the transport unit, or may be provided as a separate transport climate control unit (CCU) that can be mounted or coupled to the transport unit.

A transport climate control system typically includes (among other elements) temperature control components such as pumps, fans, heat exchangers and the like, together with associated electrical elements such as sensors (e.g. temperature sensors), a controller, a display unit, electrical drives, electrical filters and the like. The temperature control components and associated elements are typically electrically powered. The transport climate control system may thus include one or more batteries for supplying electrical power to the temperature control components and associated electrical elements.

Additionally, the transport climate control system may be configured to receive electrical power from the transport unit. For example, the transport climate control system may be configured to receive electrical power from a prime mover of the transport unit (e.g. an engine of a truck, tractor unit or the like), from a battery of the transport unit (e.g. a battery of a truck, tractor unit or the like), and/or from a utility power or "shore power" source such as an electrical grid two which the transport unit can be coupled to receive mains electricity.

SUMMARY

According to a first aspect, the invention provides a power converter for use in a host vehicle, the power converter comprising:
  a DC link;
  a DC link capacitor; and
  a pre-charge circuit configured to charge the DC link capacitor,
  wherein the pre-charge circuit comprises a boost converter comprising a switch and inductor coupling terminals configured to couple to an inductive component external to the power converter.

The inductive component may comprise an inductive component of the host vehicle, for example.

Alternatively, the inductive component may comprise an inductive component of a climate control unit coupled to the host vehicle.

The inductive component may comprise a motor and/or generator.

The inductive component may comprise a stator winding of the motor or generator.

The host vehicle or the climate control unit may comprise a converter for providing a supply voltage to the motor, and the switch may be provided by a switch of the converter.

The power converter may comprise a voltage source converter.

The power converter may comprise a voltage source converter or a voltage source inverter with an implicit diode rectifier.

The power converter may comprise a two-level converter, a three-level converter or a modular multi-level converter, for example.

The power converter may be operable to convert from AC to DC and/or from DC to AC The power converter may be operable in a second mode to convert between an input DC voltage at a first magnitude and an output DC voltage at a second magnitude.

The power converter may be operable as a boost converter, a buck converter or a buck-boost converter.

According to a second aspect, the invention provides an electrical power distribution system for a host vehicle comprising a power converter according to the first aspect.

According to a third aspect, the invention provides vehicle comprising an electrical power distribution system according to the second aspect.

BRIEF DESCRIPTION OF THE DRAWINGS

Embodiments of the invention will now be described, strictly by way of example only, with reference to the accompanying drawings, of which.

DETAILED DESCRIPTION

Figure 1:
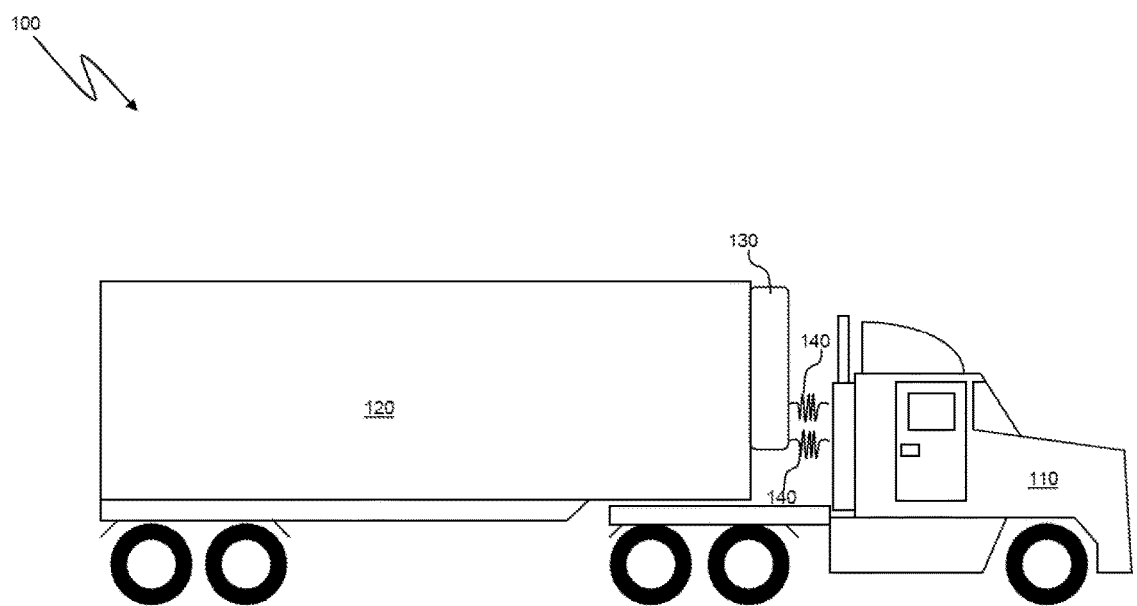
FIG. 1 is a schematic diagram showing a tractor unit and a transport unit having a transport climate control system.

Referring first to FIG. 1, a host vehicle is shown generally at 100. In the example the host vehicle is a semi-truck comprising a tractor unit 110 and a trailer unit 120. A transport climate control unit (CCU) 130 is coupled to the trailer unit 120, and can be used to control environmental conditions such as temperature, humidity, air quality, or combinations thereof within the trailer unit 120, so as to provide suitable environmental conditions for a load being transported in the trailer unit 120. The CCU 130 in this example receives electrical power from the tractor unit 110 via one or more electrical cables 140.

Figure 2:
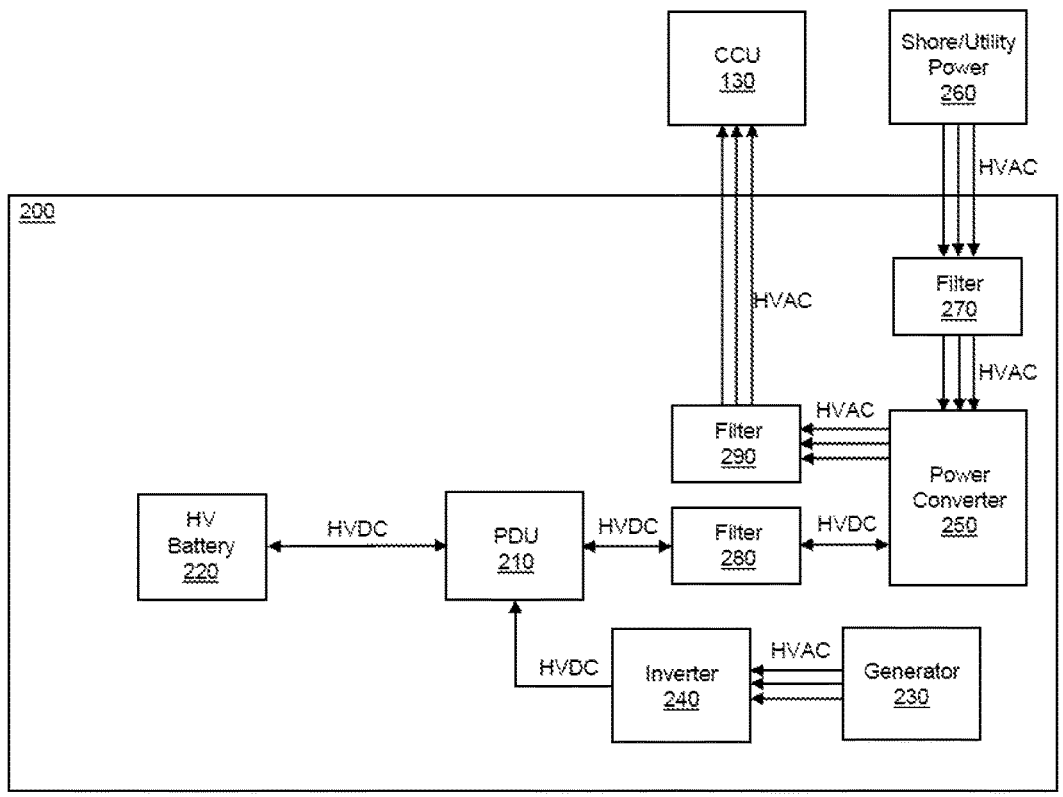
FIG. 2 is a schematic representation of an electrical power distribution system of the tractor unit of FIG. 1.

FIG. 2 is a schematic representation of an example electrical power distribution system for the tractor unit 110 of FIG. 1. The electrical power distribution system, shown generally at 200 in FIG. 2, comprises, in this example, a power distribution unit (PDU) 210 configured to receive electrical power from a plurality of different sources, and to distribute electrical power to a plurality of loads as required.

The power distribution system 200 in this example thus includes a high voltage battery 220, which is coupled to an input of the PDU 210 to supply high voltage DC (HVDC) electrical power to the PDU 210, and to receive power from the PDU 210 to charge the battery 220. The high voltage battery 220 may supply a DC voltage of the order of 400V, for example.

The power distribution system 200 further includes a generator 230 configured to generate high voltage AC (HVAC) electrical power, which may be, for example, three-phase AC. The generator 230 is coupled to a mechanical component of the tractor unit 110 (e.g. an axle, flywheel or the like), and is configured to convert mechanical energy from movement (e.g. rotation, displacement) of the mechanical component into the HVAC power. One or more electrical outputs of the generator 230 are coupled to inputs of an inverter 240, which is configured to convert the HVAC output by the generator 230 into HVDC. The DC output of the inverter 240 may have a magnitude of, for example, 400V. An output of the inverter 240 is coupled to an input of the PDU 210, so as to supply the HVDC to the PDU 210.

The power distribution system 200 further includes a power converter 250, which is operable in an AC-DC mode to convert between AC power, e.g. HVAC power from a shore/utility power source 260 external to the tractor unit 110 or from a generator (e.g. generator 230 or some other generator such as an alternator of a prime mover of the host vehicle), and DC power. The power converter 250 is coupled to a first input filter 270, which can in turn be coupled to the shore/utility power source so as to supply HVAC power to the power converter 250. The power converter 250 is also coupled to a second input/output filter 280, which is in turn coupled to the PDU 210, such that HVDC power can be supplied by the power converter 250 to the PDU 210. The power converter 250 may supply HVDC to the PDU 210 at a magnitude of 700V, for example. The power converter 250 is also coupled to a third output filter 290, which can be coupled to the CCU 130 to supply HVAC power to the CCU 130, e.g. to power a compressor driver of the CCU 130.

The power converter 250 may also be operable in a DC-DC mode to convert DC at a first voltage magnitude to DC at a second voltage magnitude. For example, the power converter 250 may be operable in a boost mode to convert a DC input voltage of relatively lower magnitude (e.g. 400V DC) to a DC voltage of relatively higher magnitude (e.g. 700V DC). Additionally or alternatively, the power converter 250 may be operable in a buck mode to convert a DC input voltage of relatively higher magnitude (e.g. 700V DC) to a DC output voltage of relatively lower magnitude (e.g. 400V DC). Thus, the power converter 250 may be operable as a boost converter, a buck converter or a buck-boost converter.

Figure 3:
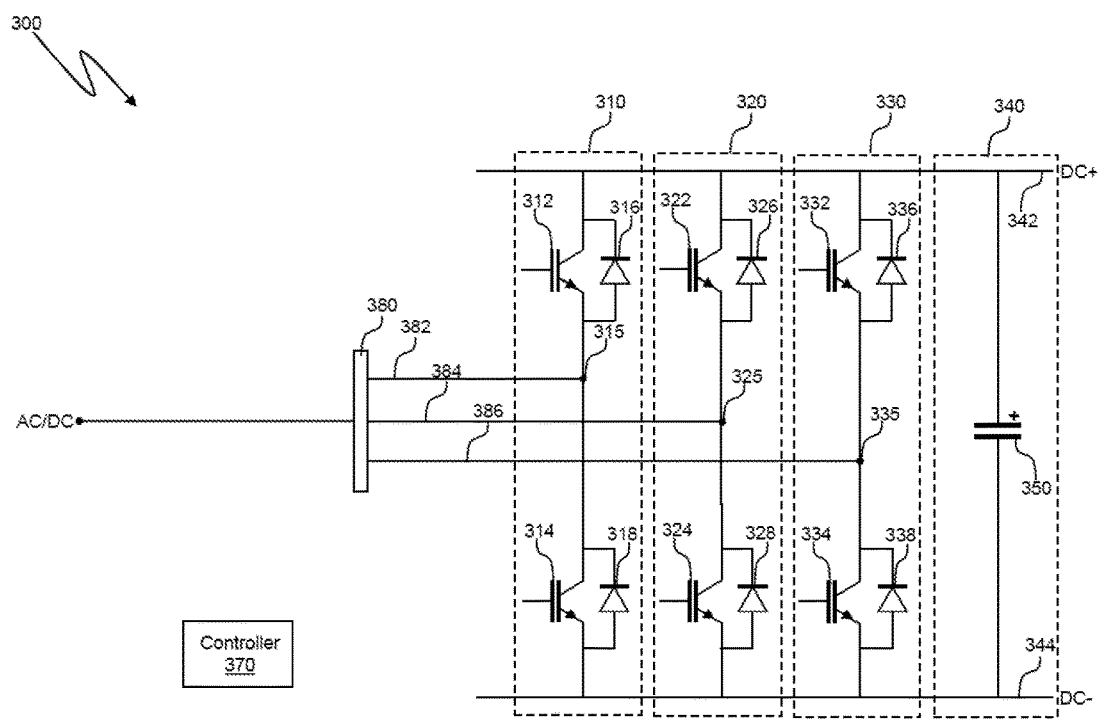
FIG. 3 is a schematic representation of power conversion circuitry for a power converter.

FIG. 3 is a schematic representation of example power conversion circuitry for a power converter that converts between AC and DC electrical power or between DC power at a first voltage magnitude and DC power at a second voltage magnitude.

The power conversion circuitry, shown generally at 300 in FIG. 3, comprises exemplary voltage source converter circuitry which is operable in an AC-DC mode and/or in a DC-AC mode. The voltage source converter circuitry includes first, second and third half-bridge modules 310, 320, 330, a DC link 340 and a DC link capacitor 350.

The first half-bridge module 310 includes a first switching element, 312, connected in series with a second switching element 314. In this example the first and second switching devices are insulated gate bipolar transistors (IGBTs), but it will be appreciated by those skilled in the art that other semiconductor switching devices may also be used.

A first freewheel diode 316 is connected in an inverse parallel configuration with the first switching device 312, with its anode connected to an emitter of the first switching device 312 and its cathode connected to a collector of the first switching device 312.

A second freewheel diode 318 is connected in an inverse parallel configuration with the second switching device 314, with its anode connected to an emitter of the second IGBT 314 and its cathode connected to a collector of the second switching device 314.

The emitter of the first switching device 312 is connected to the collector of the second switching device 314. The collector of the first switching device 312 is connected to positive rail 342 of the DC link 340, which in turn is connected to a first terminal of the DC link capacitor 350, whilst the emitter of the second switching device 314 is connected to a negative rail 342 of the DC link 340, which in turn is connected to a second terminal of the DC link capacitor 350.

A node 315 between the first and second switching devices 312, 314 is coupled to a first terminal of an AC input/output block 380 such that a first phase 382 of an AC input/output can be coupled to the node 315.

The gates of the first and second switching devices 312, 314 are connected to outputs of a controller 370, which is configured to generate control signals to switch the first and second switching devices 312, 314 on and off in a predetermined sequence when the power conversion circuitry is operating in the DC-AC mode to convert from a DC input voltage at the DC link 340 to an AC output voltage at the AC input/output block 380.

Thus, when the first switching device 312 is switched on (in response to an appropriate control signal from the controller 370), the first phase 382 is coupled to the positive rail 342 of the DC link 340. When the second switching device 314 is switched on (in response to an appropriate control signal from the controller 370), the first phase 382 is coupled to the negative rail 344 of the DC link 340. It will be appreciated that the first and second switching devices should not be switched on at the same time, as this would result in a short circuit between the positive and negative rails 342, 344 of the DC link 340. Thus the controller 370 is configured to control the timing of control signals to the first and second switching devices 312, 314 to ensure complementary operation of the first and second switching devices 312, 314 (i.e. when the first switching device 312 is switched on the second switching device 314 is switched off, and vice-versa).

The second half-bridge module 320 is of a similar construction as the first half-bridge module 310, and comprises first and second switching devices 322, 324 (which in this example are IGBTs) and first and second freewheel diodes 326, 328, which are connected in the same manner as the first and second switching devices 312, 314 and the first and second freewheel diodes 316, 318 of the first half-bridge module 310. A node 325 between the first and second switching devices 322, 324 is coupled to a second terminal of the AC input/output block 380 such that a second phase 384 of an AC input/output can be coupled to the node 325.

The gates of the first and second switching devices 322, 324 are connected to outputs of the controller 370, which is configured to generate control signals to switch the first and second switching devices 322, 324 on and off in a predetermined sequence when the power conversion circuitry operating in the DC-AC mode to convert from a DC input voltage to an AC output, as described above.

The third half-bridge module 330 is of a similar construction as the first and second half-bridge modules 310, 320, and comprises first and second switching devices 332, 334 (which in this example are IGBTs) and first and second freewheel diodes 336, 338, which are connected in the same manner as the first and second switching devices 312, 314 and the first and second freewheel diodes 316, 318 of the first half-bridge module 310. A node 335 between the first and second switching devices 332, 334 is coupled to a third terminal of the AC input/output block 380 such that a second phase 386 of an AC/DC input/output can be coupled to the node 335.

The gates of the first and second switching devices 332, 334 are connected to outputs of the controller 370, which is configured to generate control signals to switch the first and second switching devices 332, 334 on and off in a predetermined sequence when the power conversion circuitry is operating in the DC-AC mode to convert from a DC input voltage to an AC output, as described above.

Thus the power conversion circuitry 300 is operable in a DC-AC mode to convert DC electrical power received at the DC link 340 into three-phase AC power at the AC input/output block 380, using appropriate timing or phasing of control signals to the IGBTs 312-334.

The power conversion circuitry 300 is also operable in an AC-DC mode to convert three-phase AC electrical power received at the AC input/output block 380 into DC electrical power at the DC link 340. The first phase 382 is coupled to the node 315, the second phase 384 is coupled to the node 325 and the third phase 386 is coupled to the node 335.

Diodes 316, 318, 326, 328 form a full bridge rectifier between the first and second phases 382, 384. Similarly, diodes 326, 328, 336, 338 form a full bridge rectifier between the second and third phases, and diodes 336, 338, 316, 318 form a full bridge rectifier between the third and first phases. As the three phases of the input AC rotate, one of the diodes 316, 326, 336 conducts current to the positive rail 342 of the DC link 340, and one of the diodes 318, 328, 338 conducts current to the negative rail 344 of the DC link 340. Which of the diodes 316-336 conducts at a given time is governed by the positive voltages at the anodes of each of the diodes 316-336; the diode with the most positive (i.e. highest magnitude) anode voltage at a given time will conduct. Similarly, which of the diodes 318-338 conducts at a given time is governed by the negative voltages at the cathodes of each of the diodes 318-338; the diode with the most negative (i.e. highest magnitude) voltage at its cathode at a given time will conduct.

One problem with power conversion circuitry of the kind shown in FIG. 3 is that it provides an uncontrolled current path from an external AC source or DC source to the DC link 340, via the diodes 316-338. Thus, when a voltage is applied to the conversion circuitry 300 via the AC input/output block 380, the voltage at the DC link 340 will rise immediately, and this can lead to current peaks or spikes, which can destroy or damage the diodes 316-338.

To prevent damage to the diodes 316-338 from such overcurrent conditions, the DC link capacitor 350 may be pre-charged before the external AC source is coupled to the power conversion circuitry, to raise the voltage at the DC link 340 to a level equal to (or at least close to) or greater than the peak voltage of the external AC source or DC source. Pre-charging the DC link capacitor 350 to a voltage equal to or greater than the peak voltage of the external AC source in this way prevents any immediate flow of current from the external AC source through the diodes 316-338, thus preventing damage to the diodes.

Examples of circuitry for pre-charging the DC link capacitor 350 will now be described with reference to FIGS. 4-7.

Figure 4:
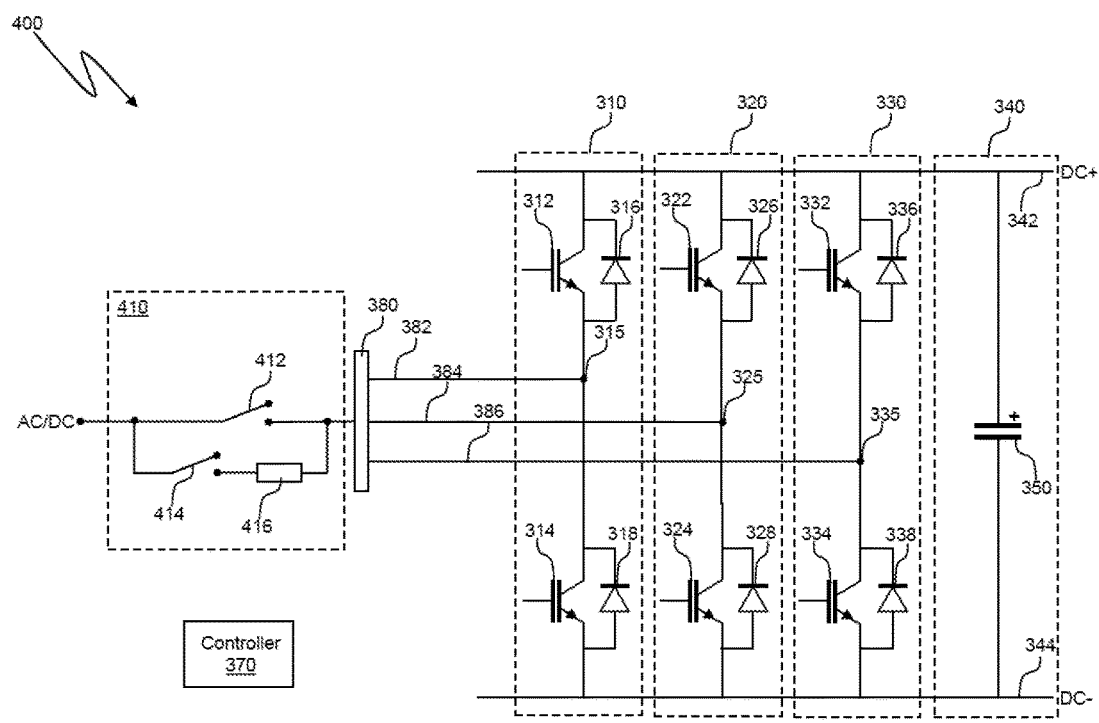
FIG. 4 is a schematic representation of power conversion circuitry for a power converter, in which a voltage source external to the power converter is used for pre-charging a DC link capacitor.

FIG. 4 is a schematic representation of power conversion circuitry for a power converter, in which a voltage source external to the power converter is used for pre-charging a DC link capacitor. The power conversion circuitry, shown generally at 400 in FIG. 4, includes a number of elements in common with the power conversion circuitry 300 of FIG. 3, and so common reference numerals have been used to denote such common elements, which will not be described again here for the sake of clarity and brevity.

The power conversion circuitry 400 differs from the power conversion circuitry 300 in that it includes pre-charge circuitry 410 coupled to the AC/DC input/output block 380 and configured to receive AC power from an external AC source.

The pre-charge circuitry 410 includes a main switch 412 (e.g. a contactor) which, when closed, couples the input/output block 380 to the external AC/DC source, and a series combination of a pre-charge switch 414 (e.g. a contactor) and a resistor 416, coupled in parallel with the main AC switch.

To pre-charge the DC link capacitor 350, the main AC switch 412 is opened and the pre-charge switch 414 is closed (e.g. in response to appropriate control signals from the controller 370). Current thus flows from the external AC source through the resistor 416 and through the diodes 316-338 to the DC link capacitor 350 to charge the DC link capacitor 350. The resistor 416 limits the inrush current that flows when the pre-charge switch is closed to a level that will not damage the diodes 316-338. When the DC link capacitor 350 has been charged to a level at which the DC link voltage is equal or close to the peak voltage of the external AC source, the pre-charge switch 414 can be opened and the main AC switch 412 can be closed (e.g. in response to appropriate control signals from the controller 370). Because the DC link capacitor 350 has been pre-charged, there is no immediate flow of current from the external AC source through the diodes 316-338, thus preventing damage to the diodes.

The pre-charge circuitry 410 is thus effective in preventing damage to the diodes 316-338. However, the switches 412, 414 and resistor 416 can be undesirably heavy and expensive. Additionally, if there are multiple different external AC/DC sources, separate pre-charge circuitry 410 must be provided for each external AC/DC source, which further increases weight and cost.

Figure 5:
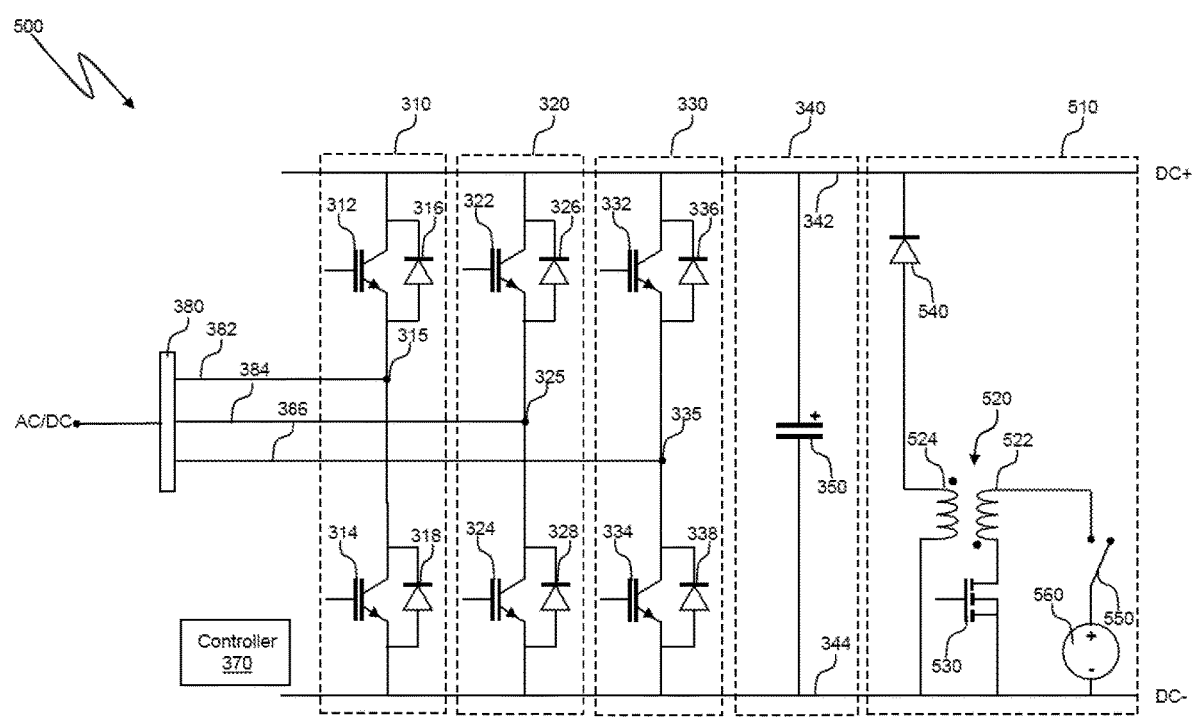
FIG. 5 is a schematic representation of alternative power conversion circuitry for a power converter, in which a flyback converter internal to the power converter is used for pre-charging a DC link capacitor.

FIG. 5 is a schematic representation of alternative power conversion circuitry for a power converter, in which a flyback converter internal to the power converter is used for pre-charging a DC link capacitor.

The power conversion circuitry, shown generally at 500 in FIG. 5, includes a number of elements in common with the power conversion circuitry 300 of FIG. 3, and so common reference numerals have been used to denote such common elements, which will not be described again here for the sake of clarity and brevity.

The power conversion circuitry 500 differs from the power conversion circuitry 300 in that it includes pre-charge circuitry 510 coupled to the DC link 340. The pre-charge circuitry 510 in this example comprises a flyback converter comprising a transformer 520, a switching device 530, a diode 540 and a pre-charge switch 550. In this example the switching device 530 is a field effect transistor (FET), but it will be appreciated by those skilled in the art that an alternative semiconductor switching device may also be used.

A first terminal of a primary coil 522 of the transformer 520 is coupled to the pre-charge switch 550. A second terminal of the primary coil 522 is coupled to a drain terminal of the switching device 530. A source terminal of the FET 530 is coupled to the negative rail 344 of the DC link 340.

A first terminal of a secondary coil 524 of the transformer 520 is coupled to the negative rail 344 of the DC link 340. A second terminal of the secondary coil 524 is coupled to an anode of the diode 540. A cathode of the diode 540 is coupled to the positive rail 342 of the DC link 340.

In operation of the pre-charge circuitry 510 to pre-charge the DC link capacitor 350 prior to coupling the AC/DC input/output block 380 to an external voltage source, the pre-charge switch 550 is closed (e.g. in response to an appropriate control signal from the controller 370). This has the effect of coupling the primary coil 522 of the transformer 520 to a low-voltage DC power supply 560, which may be, for example a DC power supply which provides a supply voltage (e.g. 15V DC) to the controller 370. A control signal is supplied, e.g. by the controller 370, to a gate terminal of the switching device 530 to alternately switch the switching device 530 on and off.

When the switching device 530 is switched on, an increasing current flows through the primary coil 522, causing a magnetic field to develop in the transformer 520. The diode 540 is reverse biased, so no current can flow from the DC link capacitor to a secondary coil 524 of the transformer 520.

When the switching device 530 is switched off, the primary coil 522 is decoupled from the power supply 560. Thus current stops flowing in the primary coil 522, which causes the magnetic field to collapse, inducing a current in the secondary coil 524, which flows through the diode 540 to the DC link capacitor 350, thereby charging the DC link capacitor 350.

Over a plurality of on-off cycles of the switching device 530 the DC link capacitor 350 is charged such that a voltage at the DC link 340 is equal to or greater than the peak voltage of the external voltage source. Once this voltage is reached, the pre-charge switch 550 can be opened (e.g. in response to an appropriate control signal from the controller 370) and the AC/DC input/output block 380 can be coupled to the external voltage source without risk of damage to the diodes 316-338 from an overcurrent condition.

In an alternative implementation the pre-charge switch 550 may be omitted, because the diode 540 provides decoupling between the DC power supply 560 and the positive rail 342 of the DC link 340, so the pre-charge switch is not required to prevent current flow from the DC power supply 560 and the positive rail 342.

The pre-charge circuitry 510 is thus effective in preventing damage to the diodes 316-338, and, in contrast to the pre-charge circuitry 410 of FIG. 4, the same pre-charge circuitry 510 can be used for every external voltage source (because the pre-charge circuitry is internal to the power converter). However, the transformer 520 is typically heavy and expensive, and thus the pre-charge circuitry 510 may undesirably add to the cost and weight of the power conversion circuitry 500.

Figure 6:
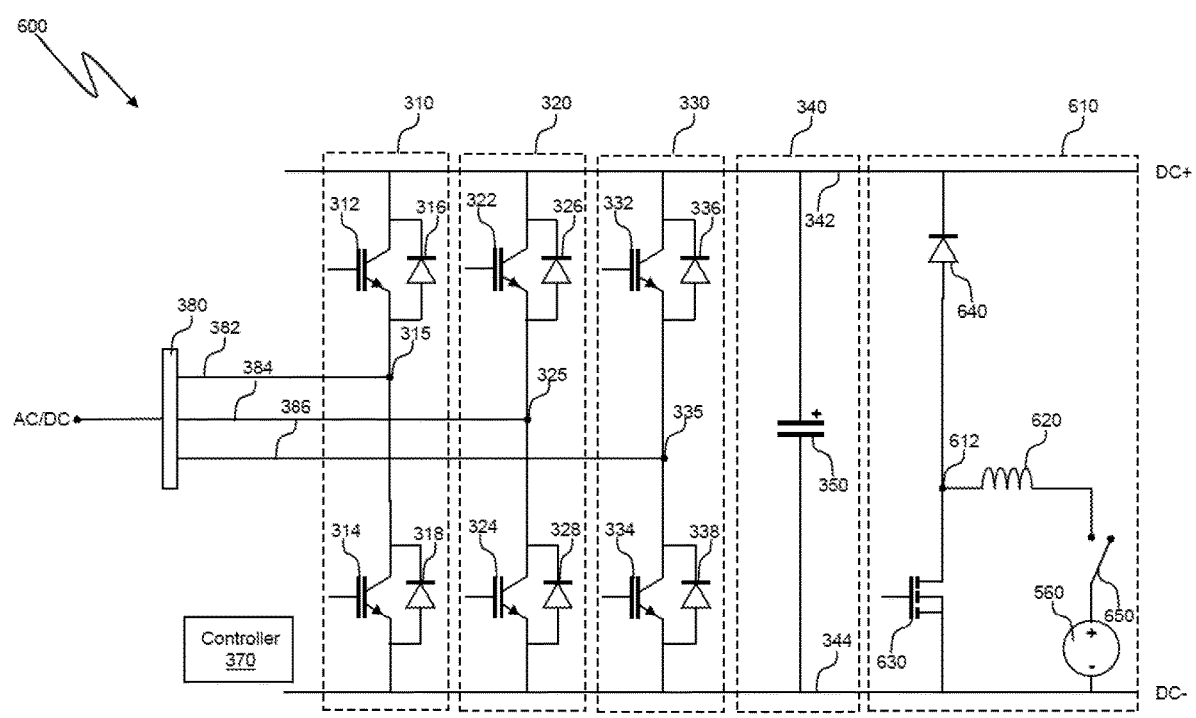
FIG. 6 is a schematic representation of further alternative power conversion circuitry for a power converter, in which a boost converter internal to the power converter is used for pre-charging a DC link capacitor.

FIG. 6 is a schematic representation of further alternative power conversion circuitry for a power converter, in which a boost converter internal to the power converter is used for pre-charging a DC link capacitor.

The power conversion circuitry, shown generally at 600 in FIG. 6, includes a number of elements in common with the power conversion circuitry 300 of FIG. 3, and so common reference numerals have been used to denote such common elements, which will not be described again here for the sake of clarity and brevity.

The power conversion circuitry 600 differs from the power conversion circuitry 300 in that it includes pre-charge circuitry 610 coupled to the DC link 340. The pre-charge circuitry 610 comprises a boost converter comprising an inductor 620, a switching device (in this example a field effect transistor (FET)) 630, a diode 640 and a pre-charge switch 650.

A first terminal of the inductor 620 is coupled to the pre-charge switch 650. A second terminal of inductor 620 is coupled to a node 612 between a drain terminal of the FET 630 and an anode of the diode 640. A source terminal of the FET 630 is coupled to the negative rail 344 of the DC link 340. A cathode of the diode 640 is coupled to the positive rail 342 of the DC link 340.

In operation of the pre-charge circuitry 610 to pre-charge the DC link capacitor 350 prior to coupling the AC input/output block 380 to an external AC voltage source, the pre-charge switch 650 is closed (e.g. in response to an appropriate control signal from the controller 370). This has the effect of coupling the first terminal of the inductor 620 to a low-voltage DC power supply 560, which may be, for example a DC power supply which provides a supply voltage (e.g. 15V DC) to the controller 370. A control voltage is supplied, e.g. by the controller 370, to a gate terminal of the switching device 630 to alternately switch the switching device 630 on and off.

When the switching device 630 is switched on, an increasing current flows through the inductor 620, causing a magnetic field to develop around the inductor 620. The diode 640 is reverse biased, so no current can flow from the DC link capacitor to the inductor 620.

When the switching device 630 is switched off, the inductor 620 is decoupled from the power supply 560. The magnetic field collapses, inducing a current in the inductor 620, which flows through the diode 640 to the DC link capacitor 350, thereby charging the DC link capacitor 350.

Over a plurality of on-off cycles of the switching device 630 the DC link capacitor 350 is charged such that a voltage at the DC link 340 is equal to or greater than the peak voltage of the external voltage source. Once this voltage is reached, the pre-charge switch 650 can be opened (e.g. in response to an appropriate control signal from the controller 370) and the input/output block 380 can be coupled to the external voltage source without risk of damage to the diodes 316-338 from an overcurrent condition.

The pre-charge circuitry 610 is thus effective in preventing damage to the diodes 316-338, and, in contrast to the pre-charge circuitry 410 of FIG. 4, the same pre-charge circuitry 610 can be used for every external voltage source (because the pre-charge circuitry is internal to the power converter). However, the pre-charge circuitry 610 requires a dedicated inductor 620, which again adds to the cost of the power converter.

Figure 7:
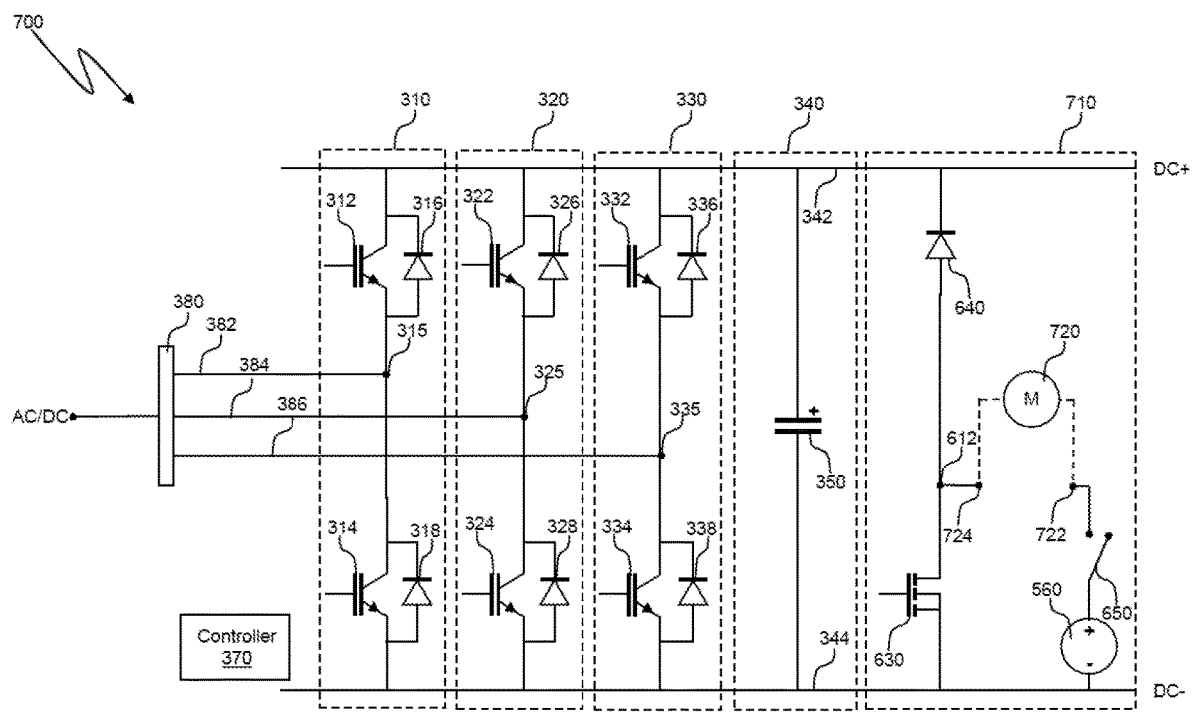
FIG. 7 is a schematic representation of further power conversion circuitry for a power converter of the electrical power distribution system of FIG. 2, in which a boost converter that uses an inductive component external to the power converter is used for pre-charging a DC link capacitor.

FIG. 7 is a schematic representation of power conversion circuitry for the power converter 250 of the electrical power distribution system of FIG. 2, in which a boost converter that uses an inductive component of a host vehicle or the CCU 130 is used for pre-charging a DC link capacitor.

The power conversion circuitry, shown generally at 700 in FIG. 7, includes a number of elements in common with the power conversion circuitry 600 of FIG. 6, and so common reference numerals have been used to denote such common elements, which will not be described again here for the sake of clarity and brevity.

Like the power conversion circuitry 600, the power conversion circuitry 700 includes pre-charge circuitry 710 comprising a boost converter. However, the power conversion circuitry 700 differs from the power conversion circuitry 600 in that, instead of a dedicated inductor 620, the inductance of an external inductive component 720, e.g. an inductive component of the of the host vehicle (e.g. tractor unit 110) or the CCU 130 acts as an inductor for the boost converter. For example, the inductance of a stator winding of a motor (e.g. a fan motor) or a generator of the host vehicle or the CCU may act as the inductor for the boost converter of the power conversion circuitry 700.

Thus in the pre-charge circuitry 710 the pre-charge switch 650 is coupled to a first inductor coupling terminal 722, and the node 612 between the drain terminal of the switching device 630 and an anode of the diode 640 is coupled to a second inductor coupling terminal 724. The first and second inductor coupling terminals 722, 724 are configured to be coupled to first and second terminals of a suitable external inductance, e.g. an inductive component of the host vehicle or the CCU 130. As indicated above, a stator winding of a motor 720, e.g. a fan motor, or a generator of the host vehicle or the CCU 130 is one example of a suitable external inductance.

For the avoidance of doubt, although the external inductive component 720 is shown within the boundary of the pre-charge circuitry 710 in FIG. 7, it is to be appreciated that the external inductive component 720 is not necessarily co-located with the pre-charge circuitry 710, but may instead be provided in some other location and coupled to the first and second inductor coupling nodes 722, 724 by wires or other suitable conductors.

As in the pre-charge circuitry 610, a source terminal of the switching device 630 of the pre-charge circuitry 710 is coupled to the negative rail 344 of the DC link 340. A cathode of the diode 640 is coupled to the positive rail 342 of the DC link 340.

The pre-charge circuitry 710 operates in the same manner as the pre-charge circuitry 610 to pre-charge the DC link capacitor 350 to a voltage equal to or greater than a peak voltage of an external voltage source to which the power conversion circuitry 700 is to be coupled, by alternately switching the switching device 630 on and off (using control signals provided to its gate terminal, e.g. by the controller 370), to provide a charging current to the DC link capacitor 350 until a desired DC link voltage is reached, at which point the pre-charge switch can be opened and the external voltage source can be coupled to the power conversion circuitry 700.

The pre-charge circuitry 710 is thus effective in preventing damage to the diodes 316-338, and, in contrast to the pre-charge circuitry 410 of FIG. 4, the same pre-charge circuitry 710 can be used for every external voltage source (because the pre-charge circuitry is internal to the power converter). Moreover, the pre-charge circuitry 710 does not require a dedicated inductor, which reduces the cost and weight of the power converter circuitry 700, and the space required to accommodate it (as compared to the power converter circuitry 400, 500, 600 of FIGS. 4-6), as well as improving reliability, in the sense that there are fewer components that could malfunction.

Thus the pre-charge circuitry 710 contributes to an improved power converter 250 with reduced cost, weight and space requirements, as well as improved reliability.

In FIG. 7 the switching device 630 and diode 640 of the boost converter are shown as dedicated components of the pre-charge circuitry 710. As will be appreciated by those skilled in the art, a motor of the host vehicle or the CCU 130 may have an associated power converter (provided in the host vehicle or the CCU 130) which supplies one or more appropriate supply voltages to the motor. By re-using existing components of this power converter, the number of components required to implement pre-charge circuitry for pre-charging the DC link capacitor 350 can be reduced further.

Figure 8:
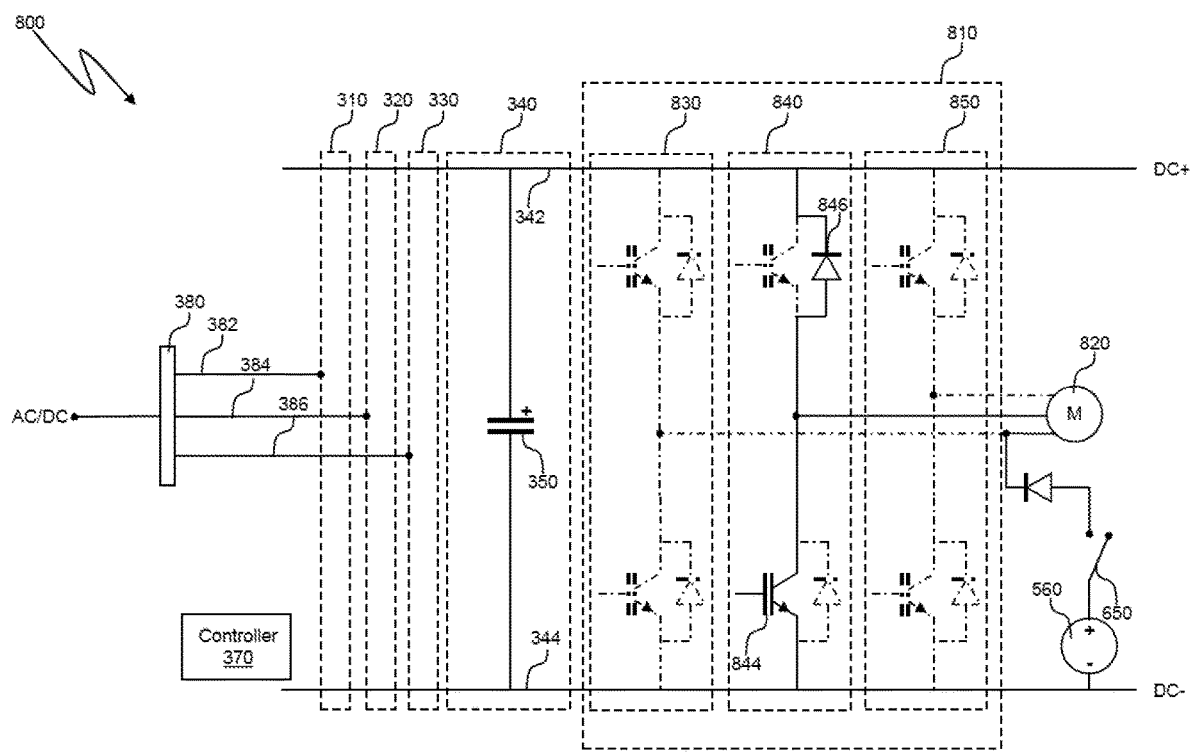
FIG. 8 is a schematic representation of further power conversion circuitry for a power converter of the electrical power distribution system of FIG. 2, in which a boost converter for pre-charging a DC link capacitor is constituted from a motor and elements of a power converter that provides supply voltages to the motor.

FIG. 8 is a schematic representation of power conversion circuitry for the power converter 250 of the electrical power distribution system of FIG. 2, in which the boost converter for pre-charging the DC link capacitor 350 is constituted from a motor of a host vehicle or the CCU 130 and elements of a power converter that provides supply voltages to the motor.

The power conversion circuitry, shown generally at 800 in FIG. 8, includes a number of elements in common with the power conversion circuitry 600 of FIG. 6, and so common reference numerals have been used to denote such common elements, which will not be described again here for the sake of clarity and brevity.

In the power conversion circuitry 800 of FIG. 8, elements of a power converter 810 that is used to provide supply voltages to a motor 820 are re-used as part of a boost converter for pre-charging the DC link capacitor 350. This re-purposing of the elements of the power converter 810 is possible because during pre-charging of the DC link capacitor 350 the motor 820 is not in use.

The power converter 810 in this example is generally similar to the power conversion circuitry 300 of FIG. 3. The power converter 810 thus includes first, second and third half-bridge modules 830, 840, 850, each comprising first and second switching devices and associated first and second inverse parallel connected freewheel diodes. Elements of the power converter 810 that are not re-used as part of the boost converter for pre-charging the DC link capacitor 350 are shown in chain-dashed outline in FIG. 8.

The inductance of the boost converter used to pre-charge the DC link capacitor 350 is provided by a stator coil of the motor 820. The switching device 630 of the boost converter is provided by the second switching device 844 of the second half-bridge module 840 of the power converter 810, and the diode 640 of the boost converter is provided by the first freewheel diode 846 of the second half-bridge module 850 of the power converter 810.

Thus the boost converter used to pre-charge the DC link capacitor 350 in the power conversion circuitry 800 of FIG. 8 comprises the pre-charge switch 650, a stator coil of the motor 820, the switching device 844 and the freewheel diode 846, and this boost converter is operable in the manner described above with reference to FIGS. 6 and 7 to pre-charge the DC link capacitor 350 from the low-voltage DC power supply 560.

By re-using the existing elements of the converter 810 in this way, the number of additional components required to implement pre-charge circuitry for pre-charging the DC link capacitor 350 can be minimised, thus reducing the physical size, weight and cost of the pre-charge circuitry, as well as improving reliability, because of the reduced number of components that could malfunction.

In the examples described above with reference to FIGS. 3-8, the power conversion circuitry comprises two-level voltage source converter circuitry, but it will be appreciated by those skilled in the art that the power conversion circuitry could instead comprise a voltage source converter of another topology, e.g. a three-level converter (e.g. with a floating capacitor) or a modular multi-level converter, and that the approaches to pre-charging the DC link capacitor described above are equally applicable to any such power conversion circuitry. More generally, the described approaches are suitable for pre-charging the DC link capacitor of any voltage source inverter or converter with an implicit diode rectifier.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality. Any reference signs in the claims shall not be construed so as to limit their scope.

The invention claimed is:

1. A power converter for use in a host vehicle, the power converter comprising:
   a DC link;
   a DC link capacitor; and
   a pre-charge circuit configured to charge the DC link capacitor,
   wherein the pre-charge circuit comprises a boost converter comprising a switch and inductor coupling terminals configured to couple to an inductive component external to the power converter, and
   wherein the DC link is configured to receive a voltage from a first voltage source external to the power converter and the switch is operative to couple the inductive component to, and to decouple the inductive component from, a second, direct current, voltage source to provide a charging current to charge the DC link capacitor.

2. The power converter according to claim 1, wherein the inductive component comprises an inductive component of the host vehicle.

3. The power converter according to claim 1, wherein the inductive component comprises an inductive component of a climate control unit coupled to the host vehicle.

4. The power converter according to claim 2, wherein the inductive component comprises a motor and/or generator.

5. The power converter according to claim 4, wherein the inductive component comprises a stator winding of the motor or generator.

6. The power converter according to claim 4, wherein the host vehicle or the climate control unit comprises a converter for providing a supply voltage to the motor, and wherein the switch is provided by a switch of the converter.

7. The power converter according to claim 1, wherein the power converter comprises a voltage source converter.

8. The power converter according to claim 1, wherein the power converter comprises a voltage source converter or a voltage source inverter with an implicit diode rectifier.

9. The power converter according to claim 8, wherein the power converter comprises a two-level converter, a three-level converter or a modular multi-level converter.

10. The power converter according to claim 1, wherein the power converter is operable to convert from AC to DC and/or from DC to AC.

11. The power converter according to claim 10, wherein the power converter is operable in a second mode to convert between an input DC voltage at a first magnitude and an output DC voltage at a second magnitude.

12. The power converter according to claim 11, wherein the power converter is operable as a boost converter, a buck converter or a buck-boost converter.

13. An electrical power distribution system for a host vehicle comprising a power converter, the power converter including:
   a DC link;
   a DC link capacitor; and
   a pre-charge circuit configured to charge the DC link capacitor,
   wherein the pre-charge circuit comprises a boost converter comprising a switch and inductor coupling terminals configured to couple to an inductive component external to the power converter, and
   wherein the DC link is configured to receive a voltage from a first voltage source external to the power converter and the switch is operative to couple the inductive component to, and to decouple the inductive component from, a second, direct current, voltage source to provide a charging current to charge the DC link capacitor.

14. A vehicle comprising an electrical power distribution system, the electrical distribution system including a power converter that includes:
   a DC link;
   a DC link capacitor; and
   a pre-charge circuit configured to charge the DC link capacitor,
   wherein the pre-charge circuit comprises a boost converter comprising a switch and inductor coupling terminals configured to couple to an inductive component external to the power converter, and
   wherein the DC link is configured to receive a voltage from a first voltage source external to the power converter and the switch is operative to couple the inductive component to, and to decouple the inductive component from, a second, direct current, voltage source to provide a charging current to charge the DC link capacitor.

* * * * *